(12) United States Patent
Nonni et al.

(10) Patent No.: US 10,995,155 B2
(45) Date of Patent: May 4, 2021

(54) CELLULOSE COMPOSITE MATERIALS AND METHODS OF MAKING AND USING THE SAME

(71) Applicant: GP Cellulose GmbH, Zug (CH)

(72) Inventors: Arthur J. Nonni, Peachtree City, GA (US); Charles E. Courchene, Snellville, GA (US); Christopher M. Slone, Atlanta, GA (US); Blair R. Carter, Marietta, GA (US); Anna L. Wells, Brunswick, GA (US); James M. Keough, Atlanta, GA (US)

(73) Assignee: GP CELLULOSE GMBH, Zug (CH)

( * ) Notice: Subject to any disclaimer, the term of this patent is extended or adjusted under 35 U.S.C. 154(b) by 419 days.

(21) Appl. No.: 15/768,035

(22) PCT Filed: Oct. 14, 2016

(86) PCT No.: PCT/US2016/056927
§ 371 (c)(1),
(2) Date: Apr. 13, 2018

(87) PCT Pub. No.: WO2017/066499
PCT Pub. Date: Apr. 20, 2017

(65) Prior Publication Data
US 2018/0312610 A1 Nov. 1, 2018

Related U.S. Application Data

(60) Provisional application No. 62/241,384, filed on Oct. 14, 2015.

(51) Int. Cl.
| | |
|---|---|
| *C08B 15/06* | (2006.01) |
| *C08B 15/04* | (2006.01) |
| *C08G 69/40* | (2006.01) |
| *C08L 1/04* | (2006.01) |
| *C08G 63/668* | (2006.01) |
| *D21C 9/00* | (2006.01) |
| *D21C 9/10* | (2006.01) |

(52) U.S. Cl.
CPC ............ *C08B 15/06* (2013.01); *C08B 15/04* (2013.01); *C08G 63/668* (2013.01); *C08G 69/40* (2013.01); *C08L 1/04* (2013.01); *D21C 9/004* (2013.01); *D21C 9/005* (2013.01); *D21C 9/1057* (2013.01)

(58) Field of Classification Search
None
See application file for complete search history.

(56) References Cited

U.S. PATENT DOCUMENTS

| | | | | |
|---|---|---|---|---|
| 4,952,684 A | * | 8/1990 | Yalpani | C07K 17/12 530/350 |
| 4,959,461 A | * | 9/1990 | Yalpani | C07K 17/12 435/178 |
| 4,963,664 A | * | 10/1990 | Yalpani | C07K 17/12 530/350 |
| 5,137,537 A | * | 8/1992 | Herron | A61L 15/28 162/157.6 |
| 5,183,707 A | * | 2/1993 | Herron | D06M 13/192 162/157.6 |
| 5,190,563 A | * | 3/1993 | Herron | D06M 13/192 162/157.6 |
| 8,778,136 B2 | | 7/2014 | Nonni et al. | |
| 9,511,167 B2 | | 12/2016 | Nonni et al. | |
| 9,512,237 B2 | | 12/2016 | Nonni et al. | |
| 9,512,561 B2 | | 12/2016 | Nonni et al. | |
| 9,512,562 B2 | | 12/2016 | Nonni et al. | |
| 9,512,563 B2 | | 12/2016 | Nonni et al. | |
| 9,777,432 B2 | | 10/2017 | Nonni et al. | |
| 9,909,257 B2 | | 3/2018 | Nonni et al. | |
| 9,926,666 B2 | | 3/2018 | Nonni et al. | |
| 9,970,158 B2 | | 5/2018 | Nonni et al. | |
| 2002/0072598 A1 | | 6/2002 | Besemer et al. | |
| 2006/0142479 A1 | * | 6/2006 | Weerawarna | C08L 33/02 525/54.2 |
| 2006/0142481 A1 | * | 6/2006 | Herriott | C08B 15/005 525/54.2 |
| 2006/0142483 A1 | * | 6/2006 | Weerawarna | C08J 3/246 525/54.3 |
| 2008/0147033 A1 | * | 6/2008 | Luo | D21C 9/005 604/367 |
| 2014/0147395 A1 | * | 5/2014 | Rieth | A61K 8/498 424/49 |
| 2014/0274680 A1 | | 9/2014 | Nonni et al. | |

FOREIGN PATENT DOCUMENTS

| | | |
|---|---|---|
| WO | WO 2011/022224 A1 | 2/2011 |
| WO | WO 2013/106703 A1 | 7/2013 |
| WO | WO 2013/158384 A1 | 10/2013 |
| WO | WO 2014/122533 A2 | 8/2014 |
| WO | WO 2014/140852 A2 | 9/2014 |
| WO | WO 2014/140940 A2 | 9/2014 |
| WO | WO 2015/138335 A1 | 9/2015 |
| WO | WO 2017/066499 A1 | 4/2017 |
| WO | WO 2017/095831 A1 | 6/2017 |
| WO | WO 2017/210079 A1 | 12/2017 |

OTHER PUBLICATIONS

International Search Report dated Feb. 23, 2017 in PCT/2016/056927.

\* cited by examiner

*Primary Examiner* — Peter A Salamon

(57) ABSTRACT

The present disclosure provides a composite of (a) oxidized cellulose comprising at least one carboxyl and (b) at least one component selected from a diamine, a diol, or mixture thereof. This disclosure further relates to methods of making such composite materials and suitable uses thereof, including in fibers, fabrics, textiles, films, fillers, packaging materials, plastics, etc.

13 Claims, No Drawings

CELLULOSE COMPOSITE MATERIALS AND METHODS OF MAKING AND USING THE SAME

The present disclosure provides a composite of (a) oxidized cellulose comprising at least one carboxyl and (b) at least one component selected from a diamine, a diol, or mixture thereof. This disclosure further relates to methods of making such composite materials and suitable uses thereof, including in fibers, fabrics, textiles, films, fillers, packaging materials, plastics, and the like.

Condensation reactions of a diamine with a dicarboxylic acid or of a diol with a dicarboxylic acid have been used to produce polymers which have been widely used in industry. For example, nylon 6,6, a polymer used in variety of applications including fibers for textiles, carpets and molded parts, can be produced by condensation reaction of adipic acid with hexamethylenediamine. Further for example, polyethylene terephthalate, a polymer used for, among other things, fibers for clothing and containers for liquids and foods, can be produced by condensation reaction of benzene-1,4-dicarboxylic acid and ethane-1,2-diol. Similarly, polybutylene succinate, a polymer used as a biodegradable alternative to many common plastics, can be produced by condensation reaction of succinic acid with 1,4-butanediol. In the present invention, the dicarboxylic acid component in these reactions may be replaced, in whole or in part, with oxidized cellulose comprising at least one carboxyl, and composite materials with new and useful properties may be obtained.

DESCRIPTION

The present disclosure provides a composite of (a) oxidized cellulose comprising at least one carboxyl and (b) at least one component selected from a diamine, a diol, or mixture thereof.

In some embodiments, the composite comprises a polymer which comprises at least one amide bond. In some embodiments, the composite comprises a polymer which comprises at least one ester bond. In some embodiments, the composite comprises a polymer which comprises both amide and ester bonds. The polymer can be crosslinked or uncrosslinked.

In some embodiments, the composite comprises a polymer comprising at least one unit that is an oxidized cellulose comprising at least one carboxyl, and at least one unit that is a diamine.

In some embodiments, the composite comprises a polymer comprising at least one unit that is an oxidized cellulose comprising at least one carboxyl, and at least one unit that is a diol.

In some embodiments, the composite comprises a polymer comprising at least one unit that is an oxidized cellulose comprising at least one carboxyl, at least one unit that is a diamine, and at least one unit that is a diol.

The Oxidized Cellulose Comprising at Least One Carboxyl

The oxidized cellulose comprising at least one carboxyl (or "oxidized cellulose") may be derived from any common source, including wood or cotton ("cellulose material"). The cellulose material may be derived from softwood fiber, hardwood fiber, and mixtures thereof. In some embodiments, the cellulose material is derived from softwood, such as southern pine. In some embodiments, the cellulose material is derived from hardwood, such as eucalyptus.

The cellulose material may be in the form of a cellulose pulp derived from any common pulping process, including chemical, mechanical, and semi-mechanical. In one embodiment, the cellulose material may be in the form of a pulp derived from a chemical process, for example a Kraft, sulfite, or sulfate pulps. In one embodiment, the cellulose material may be a Kraft pulp.

Commonly, cellulose pulp production includes an oxygen delignification process between Kraft pulping and the start of bleaching. This delignification process generally further reduces the lignin content and improves the effectiveness of the subsequent bleaching sequence. In some embodiments, the cellulose material is further subject to oxygen delignifyication after pulping. Oxygen delignification can be performed by any method known to those of ordinary skill in the art. For instance, oxygen delignification may be a conventional two-stage oxygen delignification.

The typical Kappa number (the measure used to determine the amount of residual lignin in pulp) of softwood after Kraft pulping and prior to bleaching is in the range of 28 to 32. Kappa number is determined according to TAPPI T236 cm-85. In some alternative embodiments, the cellulose pulp can be subject to Kraft pulping in a two-vessel hydraulic digester with, Lo-Solids® cooking to a kappa number ranging from about 10 to about 21. The resulting pulp may then be subjected to oxygen delignification until it reaches a kappa number of about 10 or below, for example, 8 or below, or 6.5 or below.

Following pulping and/or oxygen delignification, cellulose pulps are commonly bleached, often in multi-stage sequences that traditionally comprise strongly acidic and strongly alkaline bleaching steps. Bleaching of wood pulp is generally conducted with the aim of selectively increasing the whiteness and/or brightness of the pulp, typically by removing lignin and other impurities, without negatively affecting physical properties. Bleaching of chemical pulps, such as Kraft pulps, generally requires several different bleaching stages to achieve a desired whiteness and/or brightness with good selectivity. Typically, a bleaching sequence employs stages conducted at alternating pH ranges. This alternation is believed to aid in the removal of impurities generated in the bleaching sequence, for example, by solubilizing the products of lignin breakdown.

In some embodiments, the cellulose material may be subjected to any known bleaching processes after pulping, including any convention or after discovered series of stages conducted under conventional conditions. In some embodiments, the multi-stage bleaching sequence is a five-stage bleaching sequence. In some embodiments, the bleaching sequence is a DEDED sequence. In some embodiments, the bleaching sequence is a $D_0E_1D_1E_2D_2$ sequence. In some embodiments, the bleaching sequence is a $D_0(Eo_P)D_1E_2D_2$ sequence. In some embodiments the bleaching sequence is a $D_0(Eo)D_1E_2D_2$.

In some embodiments, the bleaching process is conducted under conditions to target about 88-90% final ISO brightness, such as ranging from about 85 to about 95%, or from about 88% to about 90%. Brightness is determined according to TAPPI T525-om02.

In some embodiments, the cellulose material is derived from a process comprising kraft pulping, followed by oxygen delignification, followed by bleaching.

According to the present invention, the cellulose material is also oxidized. The oxidized cellulose is in the form of a cellulose material that has been oxidized to increase the amount of carboxyl groups over the amount present in the cellulose prior to oxidation. Cellulose exists generally as a polymer chain comprising hundreds to tens of thousands of glucose units. In cellulose oxidation, hydroxyl groups of the glycosides of the cellulose chains can be converted, for example, to carbonyl groups such as aldehyde groups, ketone groups, and/or carboxylic acid groups. Various methods of oxidizing cellulose are known. Depending on the oxidation method and conditions used, the type, degree, and location of the carbonyl modifications may vary. According to the present invention, the method of oxidation may be any known method of cellulose oxidation that increases the amount of carboxyl groups over the amount present in the cellulose prior to oxidation.

The oxidation of the cellulose material may occur at any point during production of the cellulose material, including before or after Kraft pulping, before or after oxygen delignification, before or after bleaching, or during one or more stages of the bleaching process. In some embodiments, the method comprises oxidizing the cellulose material in one or more stages of a multi-stage bleaching sequence. In some embodiments, the cellulose material may be oxidized in either the second stage or the fourth stage of a multi-stage bleaching sequence, for example, a five-stage bleaching sequence. In some embodiments, the oxidation may be carried out in two or more stages of a multi-stage bleaching sequence, for example, both the second and fourth stages of a multistage bleaching sequence, for example, a five-stage bleaching sequence. In some embodiments, the cellulose material may be further oxidized in one or more additional stages preceding or following the bleaching sequence. The non-oxidation stages of a multi-stage bleaching sequence may include any conventional or after discovered series of stages and may be conducted under conventional conditions.

In some embodiments, the oxidation of the cellulose material may comprise treating the cellulose material with at least a catalytic amount of a metal catalyst, for example an iron or copper catalyst, and a peroxide, such as hydrogen peroxide. In some embodiments, the method comprises oxidizing the cellulose material with iron and hydrogen peroxide. The source of iron can be any suitable source, as a person of skill would recognize, such as for example ferrous sulfate (for example ferrous sulfate heptahydrate), ferrous chloride, ferrous ammonium sulfate, ferric chloride, ferric ammonium sulfate, or ferric ammonium citrate. In some embodiments, the method comprises oxidizing the cellulose material with copper and hydrogen peroxide. Similarly, the source of copper can be any suitable source as a person of skill would recognize. In some embodiments, the method comprises oxidizing the cellulose material with a combination of copper and iron and hydrogen peroxide.

In some embodiments, the method comprises oxidizing the cellulose material at an acidic pH. In some embodiments, the method comprises providing the cellulose material, acidifying the cellulose material, and then oxidizing the cellulose material at acidic pH. In some embodiments, the pH ranges from about 2 to about 6, for example from about 2 to about 5 or from about 2 to about 4. In some embodiments, the cellulose material is not subjected to substantially alkaline conditions during or after oxidation. In some embodiments, the cellulose material is subjected to substantially alkaline conditions during or after oxidation in order to reduce the degree of polymerization of the cellulose material.

In some embodiments, the method of oxidizing the cellulose material may involve acidifying a kraft pulp to a pH ranging from about 2 to about 5 (using for example sulfuric acid), mixing a source of iron (for example ferrous sulfate, for example ferrous sulfate heptahydrate) with the acidified kraft pulp at an application of from about 25 to about 250 ppm $Fe^{+2}$ based on the dry weight of the kraft pulp at a consistency ranging from about 1% to about 15% and also hydrogen peroxide, which can be added as a solution at a concentration of from about 1% to about 50% by weight and in an amount ranging from about 0.1% to about 2.0% based on the dry weight of the kraft pulp. In some embodiments, the ferrous sulfate solution is mixed with the kraft pulp at a consistency ranging from about 7% to about 15%. In some embodiments the acidic kraft pulp is mixed with the iron source and reacted with the hydrogen peroxide for a time period ranging from about 40 to about 240 minutes at a temperature ranging from about 60 to about 80° C.

In some embodiments, wherein the oxidation is carried out with a catalytic amount of a metal catalyst, for example an iron or copper catalyst, and a peroxide, such as hydrogen peroxide, there is an acidic step following oxidation, which step has been found to remove much of the residual metal catalyst. In some embodiments, where an acidic step follows the catalytic oxidation step, the resultant oxidized cellulose has an iron and copper content of less than 10 ppm each, for example less than 5 ppm.

In some embodiments, the hemicellulose content of the oxidized cellulose is substantially the same as standard unbleached kraft fiber. For example, the hemicellulose content for a softwood kraft fiber may range from about 16% to about 18%. For instance, the hemicellulose content of a hardwood kraft fiber may range from about 18% to about 25%. Carbohydrates are measured according to TAPPI T249-cm00, with analysis by Dionex ion chromatography. Cellulose content is calculated from carbohydrate composition according to the formula: Cellulose=Glucan-(Mannan/3), from TAPPI Journal 65(12):78-80 1982. Hemicellulose content is calculated from the sum of sugars minus the cellulose content.

Pulping, bleaching, and oxidation processes that may be used in the instant invention include those disclosed in published International Applications Nos. WO/2010/138941, WO/2012/170183, and WO/2013/106703, which are incorporated herein by reference.

In some embodiments, the oxidized cellulose may be further treated to modify the oxidized cellulose functional characteristics prior to reaction with a diamine, a diol, or mixture thereof in forming the composites of the present invention. In some embodiments, the oxidized cellulose may be treated with a carboxylating agent that converts aldehyde functional groups to carboxyl functional groups. In some embodiments, the carboxylating agent may be a carboxylating acid, for example chlorous acid, acidic potassium dichromate, and/or potassium permanganate. In some embodiments, the treatment of the oxidized cellulose with a carboxylating agent may involve treating the oxidized cellulose with a chlorous acid source, such as sodium chlorite and hydrogen peroxide or chlorine dioxide and hydrogen peroxide. In some embodiments, the method comprises treating the oxidized cellulose with a chlorous acid source of sodium chlorite and hydrogen peroxide. In some embodiments, the method comprises treating the oxidized cellulose with a chlorous acid source of chlorine dioxide and hydrogen peroxide.

In some embodiments, the carboxylating treatment may be carried out for a time and at a temperature that is sufficient to produce the desired completion of the reaction. For example, the carboxylating treatment may be carried out at a temperature of at least about 55° C., or at least about 80° C., and for a time ranging from about 15 to about 120 minutes, for example from about 15 to about 60 minutes, or from about 120 to about 150 minutes. The desired time and temperature of the carboxylating treatment will be readily ascertainable by a person of skill in the art.

In accordance with the disclosure, a carboxylating agent is added to the oxidized cellulose in an amount sufficient to achieve the desired carboxyl functionality of the final cellulose product. For example, sodium chlorite or chlorine dioxide can be added to the oxidized cellulose as a source of chlorous acid, as a solution at a concentration from about 0.1% to about 5%, for example from about 0.6% to about 2.0%, or from about 0.8% to about 1.4% by weight based on the dry weight of the pulp; and hydrogen peroxide can be added at a concentration of at least about 0.1%, at least about 0.15%, at least about 0.25%, or at least about 0.4%, for example from about 0.1% to about 5%, or from about 0.2% to about 1%, or from about 0.4% to about 0.8% by weight based on the dry weight of the pulp.

In some embodiments, the cellulose may be treated with a carboxylating agent after oxidation. In some embodiments, the cellulose material may be treated with a carboxylating agent prior to oxidation. In some embodiments, the cellulose material may be treated with a carboxylating agent both prior to and after oxidation.

In some embodiments, the method comprises treating the oxidized cellulose with a carboxylating agent in one or more stages of a multi-stage bleaching sequence. In some embodiments, the method comprises subjecting the cellulose to a kraft pulping step, an oxygen delignification step, and a multi-stage bleaching sequence which includes at least one catalytic oxidation stage and at least one carboxylating treatment stage following the at least one catalytic oxidation stage. In some embodiments, the oxidized cellulose may be treated with a carboxylating agent in the first, third, and/or fifth stage of a multi-stage bleaching sequence, for example, a five-stage bleaching sequence.

Accordingly, as described above, the cellulose may be subject to one or more of the following bleaching sequences, where C/A refers to carboxylating treatment, OX stands for oxidation, D stands for chlorine dioxide, and E refers to an E, EO, Ep, or EoP bleaching stage: $D_0(OX)D_1(OX)D_2$, $(C/A)(OX)D_1E_2D_2$, $D_0(OX)(C/A)E_2D_2$, $D_0(OX)D_1E_2(C/A)$, $(C/A)(OX)(C/A)E_2D_2$, $(C/A)(OX)D_1E_2(C/A)$, $D_0(OX)(C/A)E_2(C/A)$, $(C/A)(OX)(C/A)E_2(C/A)$, $(C/A)E_1D_1(OX)D_2$, $D_0E_1(C/A)(OX)D_2$, $D_0E_1D_1(OX)(C/A)$, $(C/A)E_1(C/A)(OX)D_2$, $(C/A)E_1D_1(OX)(C/A)$, $D_0E_1(C/A)(OX)(C/A)$, $(C/A)E_1(C/A)(OX)(C/A)$, $(C/A)(OX)D_1(OX)D_2$, $D_0(OX)(C/A)(OX)D_2$, $D_0(OX)D_1(OX)(C/A)$, $(C/A)(OX)(C/A)(OX)D_2$, $(C/A)(OX)D_1(OX)(C/A)$, $D_0(OX)(C/A)(OX)(C/A)$, and $(C/A)(OX)(C/A)(OX)(C/A)$.

Oxidation and carboxylating processes that may be used in the instant invention include those disclosed in published International Applications Nos. WO/2014/140940 and WO/2015/138335, which are incorporated herein by reference.

As used herein, the term "oxidized cellulose comprising at least one carboxyl" may comprise situations wherein the cellulose has been oxidized but not further treated with a carboxylating agent or where the cellulose has been both oxidized and treated with a carboxylating agent.

In some embodiments, the oxidized cellulose may have a viscosity ranging from about 3.0 mPa·s to about 6 mPa·s, measured according to TAPPI T230-om99. In some embodiments, the viscosity ranges from about 4.0 mPa·s to about 5.5 mPa·s. In some embodiments, the viscosity ranges from about 4.5 mPa·s to about 5.5 mPa·s. In some embodiments, the viscosity ranges from about 5.0 mPa·s to about 5.5 mPa·s. In some embodiments, the viscosity is less than 6 mPa·s, less than 5.5 mPa·s, less than 5.0 mPa·s, less than 4.5 mPa·s, or less than 3.5 mPa·s.

In some embodiments, when the oxidized cellulose is a softwood Kraft fiber, the cellulose fiber may have a length-weighted average fiber length that is about 2 mm or greater. Fiber length may be determined on a Fiber Quality Analyzer™ from OPTEST, Hawkesbury, Ontario, according to the manufacturer's standard procedures In some embodiments, the average fiber length is no more than about 3.7 mm. In some embodiments, the average fiber length is at least about 2.2 mm, about 2.3 mm, about 2.4 mm, about 2.5 mm, about 2.6 mm, about 2.7 mm, about 2.8 mm, about 2.9 mm, about 3.0 mm, about 3.1 mm, about 3.2 mm, about 3.3 mm, about 3.4 mm, about 3.5 mm, about 3.6 mm, or about 3.7 mm. In some embodiments, the average fiber length ranges from about 2 mm to about 3.7 mm, or from about 2.2 mm to about 3.7 mm.

In some embodiments, the oxidized cellulose may have a carboxyl content of at least about 6 meq/100 g, for example, at least about 7.0 meq/100 g, at least about 8.0 meq/100 g, or at least about 10.0 meq/100 g, measured according to TAPPI T237-cm98. In some embodiments, the carboxyl content ranges from about 1 meq/100 g to about 15 meq/100 g, for example from about 6 meq/100 g to about 12 meq/100 g.

In some embodiments, the oxidized cellulose has an aldehyde content ranging from 1 meq/100 g to about 15 meq/100 g, for example, ranging from about 5 to about 12 meq/100 g. In some embodiments, the aldehyde content is less than about 12 meq/100 g, for example, less than 8 meq/100 g, less than 6 meq/100 g, less than 4 meq/100 g, or less than 2 meq/100 g. Aldehyde content is measured according to Econotech Services LTD, proprietary procedure ESM 055B.

The ratio of carboxyl content to aldehyde content in the oxidized cellulose may be greater than 0.5:1, for example greater than 1:1. In some embodiments, the ratio of carboxyl content to aldehyde content may be from about 0.5:1 to 5:1, for example from about 1:1 to about 3:1.

In some embodiments, the oxidized cellulose of the disclosure has a carbonyl content ranging from 1 meq/100 g to about 15 meq/100 g, for example, ranging from about 5 to about 12 meq/100 g. In some embodiments, the carbonyl content is less than about 12 meq/100 g, for example, less than 8 meq/100 g, less than 6 meq/100 g, less than 4 meq/100 g, or less than 2 meq/100 g. Carbonyl content is calculated from Copper Number according to the formula: carbonyl=(Cu. No. —0.07)/0.6, from *Biomacromolecules* 2002, 3, 969-975.

In some embodiments, the oxidized cellulose has a copper number ranging from about 0.1 to about 5. Copper Number is measured according to TAPPI T430-cm99. In some embodiments, the copper number is less than about 4.0, for example, less than about 2, or less than about 1.

The oxidized cellulose may further be treated with other agents prior to reaction with a diamine, a diol, or mixture thereof in forming the composites of the present invention, including, without limitation, one or more of surface active agents, softeners, and debonders.

The at Least One Diamine

The diamine suitable for the composite can include any organic compounds containing at least two amino groups. Exemplary diamines can be tetramethylenediamine, hexamethylenediamine, nonamethylenediamine, decamethylenediamine, undecamethylenediamine, dodecamethylenediamine, 2,2,4(2,4,4)-trimethylhexamethylenediamine, 5-methylnonamethylenediamine, 2,4-dimethyloctamethylenediamine, metaxylylenediamine, paraxylylenediamine, 1,3-bis(aminomethyl)cyclohexane, 1-amino-3-aminomethyl-3,5,5-trimethylcyclohexane, 3,8-bis(aminomethyl)tricyclodecane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, and the like, as well as mixtures thereof. In some embodiments, the diamine is hexamethylenediamine.

The at Least One Diol

The diol suitable for the composite can include any organic compounds containing at least two hydroxyl groups. Exemplary diols can be C2-4 aliphatic diols such as ethylene glycol, diethylene glycol, 1,2-propylene glycol, 1,3-propylene glycol, 1,4-butane diol, 1,2-butylene diol, 1,4-butylene diol, cyclohexane dimethanol, neopentyl glycol, glycerol, and the like, as well as mixtures thereof. In some embodiments, the diol is ethane-1,2-diol. In some embodiments, the diol is 1,4-butane diol.

Optional Additional Carboxyl

In some embodiments, the composite may further comprise any additional carboxyl containing component, in addition to the oxidized cellulose comprising at least one carboxyl. Examples of other, optional, carboxyl containing components include adipic acid, suberic acid, azelaic acid, sebacic acid, dodecanedioic acid, phthalic anhydride terephthalic acid, isophthalic acid, naphthalenedicarboxylic acid, 2-chloroterephthalic acid, 2-methylterephthalic acid, 5-methylisophthalic acid, hept-5-ene-2,3-dicarboxylic acid, 5-sodiumsulfoisophthalic acid, hexahydroterephthalic acid, hexahydroisophthalic acid, diglycolic acid, and the like, and mixtures thereof.

Methods of Preparing the Composite

The present disclosure also provides a process of preparing the composite disclosed herein, which comprises mixing the oxidized cellulose comprising at least one carboxyl with at least one component selected from a diamine or diol, or mixtures thereof, and causing a polymerization or condensation reaction. In general, the composite materials may be formed by any known process used for forming polyamides and/or polyesters, with the oxidized cellulose comprising at least one carboxyl replacing some or all of the traditional dicarboxylic acid component used in those reactions. In some embodiments, the composite is formed by a polymerization reaction. In some embodiments, the composite is formed by a condensation reaction.

Products of the Present Invention

The composite disclosed herein can be used in the production of a variety of end-use products, including at least fibers, fabrics, textiles, films, sheets, filaments, yarns, tapes, foams, nets, fillers, packaging, and plastics. In some embodiments, the composite may be used to replace some or all of traditional polyamides and polyesters in their known end-uses. The composite materials of the present invention possess new and useful properties as compared to those traditional polyamide and polyester materials.

A number of embodiments have been described. Nevertheless, it will be understood that various modifications may be made without departing from the spirit and scope of the disclosure. Accordingly, other embodiments are within the scope of the following claims.

We claim:

1. A method of making a composite comprising mixing an oxidized cellulose comprising at least one carboxyl with at least one component selected from a diamine, a diol, or mixture thereof to form a composite, wherein the oxidized cellulose is formed by a method comprising at least one step comprising oxidation with hydrogen peroxide and a catalyst comprising iron, copper, or a combination of iron and copper at an acidic pH.

2. The method of claim 1, wherein the oxidized cellulose comprises a carboxyl content of from about 1 meq/100 g to about 15 meq/100 g.

3. The method of claim 1, wherein the oxidized cellulose comprises both carboxyl and aldehyde groups, and wherein the ratio of carboxyl content to aldehyde content is from about 1:1 to about 3:1.

4. The method of claim 1, wherein the oxidized cellulose comprising at least one carboxyl is reacted with at least one diamine selected from at least one of tetramethylenediamine, hexamethylenediamine, nonamethylenediamine, decamethylenediamine, undecamethylenediamine, dodecamethylenediamine, 2,2,4(2,4,4)-trimethylhexamethylenediamine, 5-methylnonamethylenediamine, 2,4-dimethyloctamethylenediamine, metaxylylenediamine, paraxylylenediamine, 1,3-bis(aminomethyl)cyclohexane, 1-amino-3-aminomethyl-3,5,5-trimethylcyclohexane, 3,8-bis(aminomethyl)tricyclodecane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, and mixtures thereof.

5. The method of claim 4, wherein the oxidized cellulose comprising at least one carboxyl is reacted with hexamethylenediamine.

6. The method of claim 1, wherein the oxidized cellulose comprising at least one carboxyl is reacted with at least one diol selected from at least one of ethylene glycol, diethylene glycol, 1,2-propylene glycol, 1,3-propylene glycol, 1,4-butane diol, 1,2-butylene diol, 1,4-butylene diol, cyclohexane dimethanol, neopentyl glycol, glycerol, and mixtures thereof.

7. The method of claim 6, wherein the oxidized cellulose comprising at least one carboxyl is reacted with ethane-1,2-diol.

8. The method of claim 6, wherein the oxidized cellulose comprising at least one carboxyl is reacted with 1,4-butane diol.

9. The method of claim 1, wherein the reaction further comprises at least one dicarboxylic acid component selected from the group consisting of adipic acid, suberic acid, azelaic acid, sebacic acid, dodecanedioic acid, phthalic anhydride terephthalic acid, isophthalic acid, naphthalenedicarboxylic acid, 2-chloroterephthalic acid, 2-methylterephthalic acid, 5-methylisophthalic acid, hept-5-ene-2,3-dicarboxylic acid, 5-sodiumsulfoisophthalic acid, hexahydroterephthalic acid, hexahydroisophthalic acid, diglycolic acid, and mixtures thereof.

10. The method of claim 1, wherein the oxidized cellulose is formed by a method comprising at least one step comprising catalytic oxidation with iron and hydrogen peroxide at an acidic pH.

11. The method of claim 1, wherein the oxidized cellulose is further treated with at least one carboxylating treatment following the at least one oxidation step.

12. The method of claim 11, wherein the carboxylating treatment comprises application of chlorine dioxide and hydrogen peroxide to the oxidized cellulose.

13. The method of claim 11, wherein the at least one catalytic oxidation and the at least one carboxylating treatment take place during a multi-stage bleaching process, and wherein the multi-stage bleaching process is a five stage bleaching process comprising a sequence chosen from (C/A)(OX)(C/A)$E_2D_2$, (C/A)(OX)$D_1E_2$(C/A), (C/A)(OX)(C/A)$E_2$(C/A), (C/A)$E_1D_1$(OX)(C/A), $D_0E_1$(C/A)(OX)(C/A), (C/A)E₁(C/A)(OX)(C/A), (C/A)(OX)(C/A)(OX)D₂, (C/A)(OX)D₁(OX)(C/A), Do(OX)(C/A)(OX)(C/A), and (C/A)(OX)(C/A)(OX)(C/A), where OX refers to the catalytic oxidation, C/A refers to the carboxylating treatment, D refers to a chlorine dioxide bleaching stage, and E refers to an E, EO, Ep, or EoP bleaching stage.

* * * * *